US009473809B2

(12) United States Patent
Fan et al.

(10) Patent No.: US 9,473,809 B2
(45) Date of Patent: Oct. 18, 2016

(54) METHOD AND APPARATUS FOR PROVIDING PERSONALIZED CONTENT

(75) Inventors: James Fan, San Ramon, CA (US); David Chen, Fremont, CA (US); Richard Kuo, Mountain View, CA (US); Jennifer K. Lam, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 326 days.

(21) Appl. No.: 13/305,911

(22) Filed: Nov. 29, 2011

(65) Prior Publication Data

US 2013/0139193 A1  May 30, 2013

(51) Int. Cl.
| H04N 7/10 | (2006.01) |
| H04N 21/422 | (2011.01) |
| H04N 7/15 | (2006.01) |
| H04N 21/2668 | (2011.01) |
| H04N 21/442 | (2011.01) |
| H04N 21/472 | (2011.01) |
| H04N 21/4788 | (2011.01) |
| H04N 21/658 | (2011.01) |

(52) U.S. Cl.
CPC ........ H04N 21/42222 (2013.01); H04N 7/157 (2013.01); H04N 21/2668 (2013.01); H04N 21/44218 (2013.01); H04N 21/4788 (2013.01); H04N 21/47202 (2013.01); H04N 21/6582 (2013.01)

(58) Field of Classification Search
CPC ........... H04N 21/458; H04N 21/2668; H04N 21/44218
USPC ...................................................... 725/9–21
See application file for complete search history.

(56) References Cited

U.S. PATENT DOCUMENTS

| 2003/0107589 | A1  | 6/2003  | Liu |
| 2003/0231179 | A1  | 12/2003 | Suzuki |
| 2005/0185711 | A1  | 8/2005  | Pfister |
| 2008/0022309 | A1* | 1/2008  | Begeja et al. .................. 725/46 |
| 2008/0086754 | A1* | 4/2008  | Chen ................. H04L 29/06027 725/105 |
| 2008/0259155 | A1  | 10/2008 | McLelland |
| 2009/0187936 | A1* | 7/2009  | Parekh et al. .................. 725/25 |
| 2009/0199254 | A1* | 8/2009  | White et al. .................. 725/110 |
| 2010/0070987 | A1* | 3/2010  | Amento et al. .................. 725/10 |
| 2010/0070999 | A1* | 3/2010  | Morris et al. .................. 725/39 |
| 2010/0153989 | A1* | 6/2010  | Jing .................... H04L 12/2812 725/34 |
| 2010/0228547 | A1* | 9/2010  | Scott et al. .................. 704/235 |
| 2010/0306655 | A1* | 12/2010 | Mattingly et al. ............ 715/720 |
| 2011/0255673 | A1  | 10/2011 | Baker |
| 2012/0054278 | A1* | 3/2012  | Taleb et al. .................. 709/204 |
| 2012/0150592 | A1* | 6/2012  | Govrik et al. ............... 705/14.1 |
| 2012/0324492 | A1* | 12/2012 | Treadwell et al. ............. 725/10 |

* cited by examiner

*Primary Examiner* — Junior Mendoza
(74) *Attorney, Agent, or Firm* — Atanu Das; Guntin & Gust, PLC

(57) ABSTRACT

A system that incorporates teachings of the present disclosure may include, for example, receiving reaction information from one or more sensors located at a second location that is representative of a reaction by a second user at the second location to the presentation of the personalized content, analyzing the reaction information to determine a response based at least in part on trait information associated with different first users, selecting a second portion of the recorded segments based on a comparison of the determined response with a context identified for each of received recorded segments, and adjusting personalized content to include the selected second portion of the recorded segments. Other embodiments are disclosed.

18 Claims, 10 Drawing Sheets

800

_US 9,473,809 B2_

METHOD AND APPARATUS FOR PROVIDING PERSONALIZED CONTENT

FIELD OF THE DISCLOSURE

The present disclosure relates generally to communications and more specifically to providing personalized content.

BACKGROUND

Communication service providers offer bundled voice, data and video services to their customers. The services offered by different providers often overlap in available channel line-ups and available content. Video-on-demand services are offered by service providers that enable a variety of selections of content without scheduling constraints.

Viewers have varying interests and time constraints that are often not satisfied by the service offerings of the service providers.

DETAILED DESCRIPTION

Figure 1:
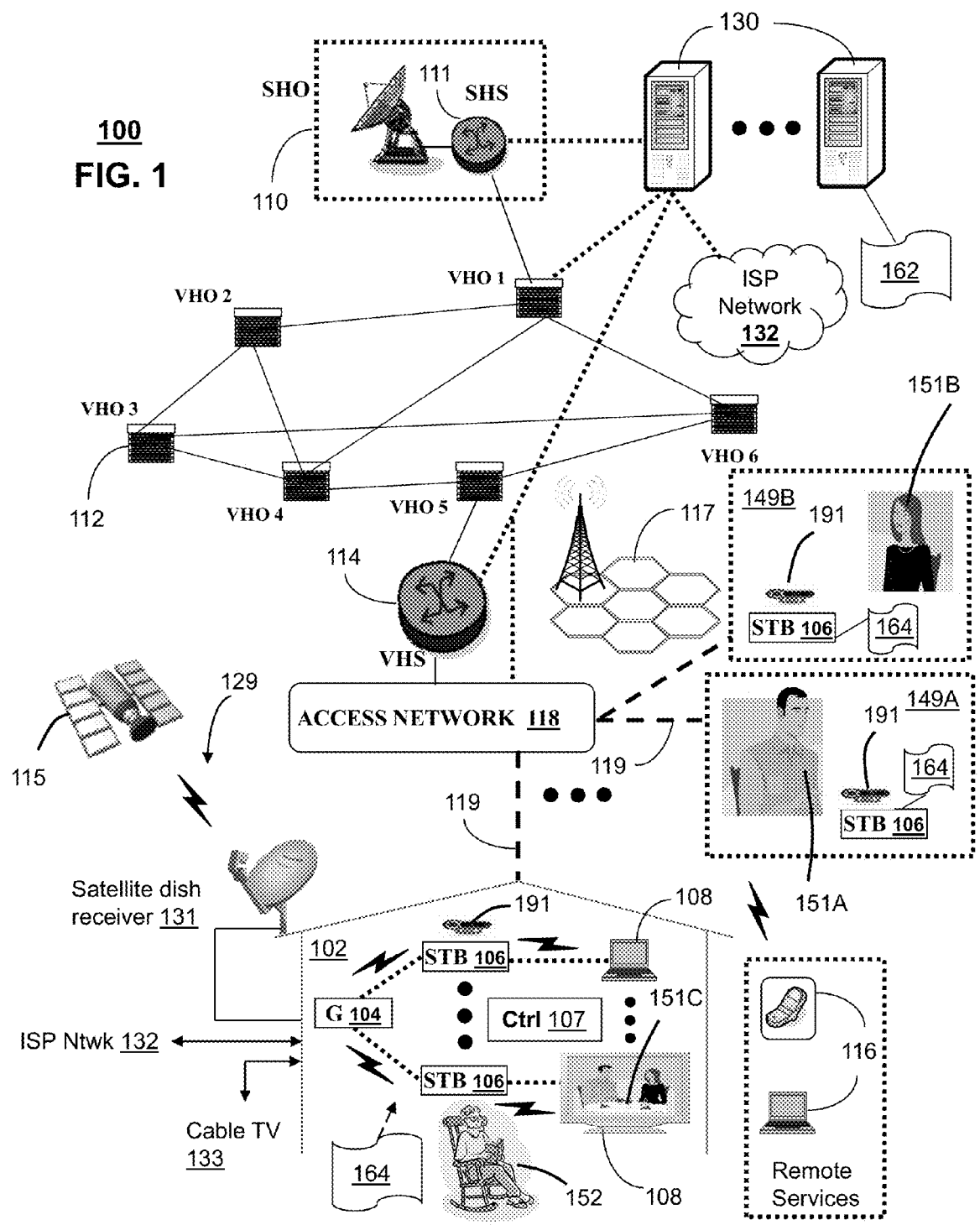
FIG. 1 depicts an illustrative embodiment of a communication system that provides content.

The present disclosure describes, among other things, illustrative embodiments for establishing a virtual conference for a viewer based on pre-recorded content segments that are generated by friends, family and/or other individuals associated with the viewer. The pre-recorded segments can be selected for presentation based on an analysis of captured audio and/or video reactions of the viewer during the virtual conference so as to simulate a conversation with the viewer. Graphics can be added to the pre-recorded segments to simulate presence in a desired location, such as, for example, adjusting the pre-recorded segments to display the viewer's table to simulate the friends, family and/or other individuals being present together at the viewer's house or other location.

One embodiment of the present disclosure includes an apparatus comprising a memory having computer instructions and a controller circuit coupled to the memory. The controller circuit when executing the computer instructions is operable to receive over a network a plurality of first recorded segments captured by a first video camera at a first premises, where the plurality of first recorded segments comprises video and audio content of a first user. The controller circuit is operable to receive over the network a plurality of second recorded segments captured by a second video camera at a second premises, where the plurality of second recorded segments comprises video and audio content of a second user. The controller circuit is operable to analyze the plurality of first and second recorded segments to determine a context for each of the plurality of first and second recorded segments. The controller circuit is operable to provide a set top box with access to a personalized media channel, where the set top box is located at a third premises of a third user. The controller circuit is operable to generate personalized content comprising at least a portion of one first recorded segment of the plurality of first recorded segments and at least a portion of one second recorded segment of the plurality of second recorded segments, where the generated personalized content simulates the first and second users being together at a single location. The controller circuit is operable to provide the generated personalized content via the personalized media channel to the set top box for presentation and to receive reaction information from the set top box that is representative of a reaction by the third user to the presentation of the personalized content, where the reaction information is captured by an image sensor and an audio sensor coupled with the set top box for capturing video and audio content of the third user. The controller circuit is operable to access first trait information associated with the first user and second trait information associated with the second user and to analyze the reaction information to determine a response, where the response is determined based at least in part on the first and second trait information. The controller circuit is operable to select at least one other first or second recorded segment from the plurality of first and second recorded segments based on a comparison of the determined response with the determined context for each of the plurality of first and second recorded segments. The controller circuit is operable to adjust the personalized content to include the selected at least one other first or second recorded segment.

One embodiment of the present disclosure is a non-transitory computer-readable storage medium comprising computer instructions which when executed by a processor cause the processor to receive recorded segments from different first users at different first locations, provide a media device at a second location with access to a personalized media channel, and provide personalized content to the media device via the personalized media channel, where the personalized content comprises a first portion of the recorded segments. The computer instructions enable receiving reaction information from one or more sensors located at the second location that is representative of a reaction by a second user at the second location to the presentation of the personalized content and analyzing the reaction information to determine a response based at least in part on trait information associated with the different first users. The computer instructions enable selecting a second portion of the recorded segments based on a comparison of the determined response with a context identified for each of the recorded segments and adjusting the personalized content to include the selected second portion of the recorded segments.

One embodiment of the present disclosure includes a method comprising authenticating first and second users as being a members of a community, enabling use of a first remote controller of a set top box by the first user based on the community membership, and enabling use of a second remote controller of the set top box by a second user based on community membership. The method includes providing access for the set top box to a personalized media channel associated with the community and receiving at the set top box, a first user input from the first remote controller. The method includes adjusting first personalized content presented on a first portion of a display by the set top box based on the received first user input and receiving at the set top box, a second user input from the second remote controller. The method includes adjusting second personalized content presented on a second portion of the display by the set top box based on the received second user input, The method includes capturing video and audio content at a location that includes the first and second users, where the video and audio content is captured using a sensor that is in communication with the set top box. The method includes providing third personalized content to a server for delivery to another set top box at another location via the personalized media channel, where the third personalized content is based on at least a portion of the video and audio content. The set top box can enable simultaneous user interaction by the first and second remote controllers, and the set top box can enable simultaneous presentation and adjustment of the first and second personalized content.

FIG. 1 depicts an illustrative embodiment of a first communication system 100 for delivering content. The content can be of various types including personal content that has images (e.g., still or moving) and/or audio generated by one or more members of a community associated with a personalized media channel utilized for delivery of the content. The content can be of other types of content including broadcast programming, video-on-demand, video games, data, voice communications and so forth. The content can be combinations of content types, such as enabling presentation of broadcast programming while video and/or audio content is captured and exchanged between members of the community, such as through partitioning a display screen with different types of content. The content can include pre-recorded segments that enable simulation of a real-time communication session with a user, such as through analyzing user interaction with presented personalized content and selecting pre-recorded segments that are responsive to or otherwise associated with the analyzed user interaction. For example, pre-recorded segments can be used to enable a daughter to have a video conference breakfast with her mother even though the daughter is not available at the time the mother is eating breakfast.

In one or more embodiments, the communication system 100 can generate the content or a portion thereof by capturing images and/or audio via a sensor, such as one or more cameras 191 (e.g., a network of cameras). In one embodiment, the cameras 191 can be controlled in whole or in part by the service provider and/or a user associated with the cameras 191, such as controlling a viewing angle and/or a zooming function of the cameras. Whether or not the cameras 191 are controllable by the user can be based on a number of different factors, including the service plan associated with the user.

The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent in whole or in part, for example, audio content, moving image content such as 2D or 3D videos, video games, virtual reality content, still image content, graphics and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia content, including broadcast content or personal content obtained via the network of cameras 191, via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and/or media devices 108 can utilize tethered communication technologies (such as coaxial, powerline or phone line wiring) or can operate over a wireless access protocol such as Wireless Fidelity (WiFi), Bluetooth, Zigbee, or other wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD, EPG and access to personal content as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services, including access to personal content.

The embodiments of the present disclosure can apply to over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or portable communication devices 116.

Multiple forms of media services can be offered to media devices over landline technologies in the communication system 100 such as through the devices and/or techniques described above. Additionally, media services can be offered to media devices by way of a wireless access base station 117 operating according to wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on.

Communication system 100 can also provide for all or a portion of the computing devices 130 to function as a personal content coordination server (herein referred to as server 130). The server 130 can use common computing and communication technology to perform function 162, which can include among things, coordinating the distribution and/or generation of personal content utilizing STBs 106 and cameras 191 located at one or more locations in system 100. In one embodiment, control over the cameras can be exerted by the user, the server 130 and/or by a remote communication device, such as a mobile phone that is receiving the personalized content, via wireless and wired connections.

In one or more embodiments, the STB 106, the server 130 and/or another computing device can perform recognition analysis on one or more captured images and/or audio content to identify and/or authenticate a user as a member of a community and/or to determine a subject matter associated with a segment of the content. The recognition analysis can include facial recognition, as well as recognition based on other criteria. The analysis can also include other techniques and components such as conversion of audio to text, use of natural language engines, use of grammatical recognition libraries, and/or use of rhetorical recognition libraries. The server 130 can have access to recognition information associated with user(s) (e.g., the subscriber and/or individuals that have been associated with the subscriber for one or more communities), such as images of the user(s) and/or audio samples. For instance, the images can be facial images, full body images, side images, back images and so forth. The audio samples can be of various sentences or phrases spoken by the user(s) and voice recognition can be applied to audio content captured in combination with the images.

The server 130 can also be used to facilitate the gathering of pre-recorded content, such as providing a platform for exchanging communications including control signals between the STBs 106 and one or more of the cameras 191. In one embodiment, the server 130 can provide a platform for negotiation to obtain selected pre-recorded segments, such as from a member of the community that is generating or capturing images of a cooking tutorial. The negotiation can be based on a number of factors including financial incentives, agreements to share resources or share other pre-recorded content, and so forth.

In one or more embodiments, the server 130, the STB 106 and/or another computing device can be used for storing personal content that includes the captured video and audio content. The server 130, the STB 106 and/or another computing device can also be utilized to provide access to the personal content to a variety of remote devices that can include the mobile communication devices 116, as well as other devices. The access to the personal content can be based on membership in the community associated with the personalized media channel, as well as other arrangements, such as providing temporary access to a non-member to evaluate joining the community or as a guest of a member of the community.

The cameras 191 enable capturing images and/or audio content of locations, such as where a community member is situated, including at various viewing angles and/or at a selected viewing angle. In one embodiment, parameters associated with the images, such as a desired viewing angle or a desired distance can be designated by the user, including in a user profile or as part of a subscription plan. The designated parameters can be utilized by the server 130, the STB 106 and/or another computing device in selecting one or more cameras 191 from a group of cameras in communication with the STB 106 for capturing the content at a selected location. The particular configuration, location and type of cameras can vary.

In one embodiment, ancillary information can be provided with the personal content based on the determined subject matter of the audio content. For example, audio content that asserts that it is very cold at the location can be analyzed to obtain ancillary information related to techniques for staying warm, such as particular clothes to wear.

In one embodiment, the server 130, the STB 106 and/or another computing device can be utilized for filtering portions of the personal content. As an example, parental controls, user preferences, digital rights management and so forth can be utilized in determining whether captured images, audio or portions thereof should be filtered out (e.g., obscured or removed) of the generation of the personal content. For instance, audio describing a confidential matter or a matter subject to proprietary rights can be identified and filtered out of the personal content. The filtering can be based on user preferences, information stored in a user profile, monitored consumption of a user and so forth. The filtering can be based on criteria associated with the user of the STB 106 capturing the content and/or can be associated with a viewer that has requested access to the personal media channel that delivers the personal content. The filtering can be performed by the server 130, the STB 106 and/or another computing device, utilizing image and/or audio recognition. In one embodiment, the original images and/or original audio can be retained so that the filtered portions can be viewed. In one or more embodiments, the filtering can be subject to filtering rules associated with the community that is sponsoring or otherwise affiliated with the personalized media channel. For example, a community for family entertainment may filter out personal content that is determined to be inappropriate for children.

In one or more embodiments, the server 130, the STB 106 and/or another computing device can perform recognition analysis on the personal content to identify marketing material for addition to the personal content. In one embodiment, marketing material present in the personal content, such as a soda can of a particular brand, can be identified and the personal content can alter the images to provide other marketing material, such as presenting a newer version of the brand or changing the brand. As another example, an image may include an obsolete model of a product of a commercial entity. The server 130, the STB 106 and/or the computing device can recognize the marketing material associated with the obsolete model and adjust the image to depict the current model of the product. The marketing material in this example is not intended to be limited to direct advertising and can include the product being present in the image, such as replacing an older version of a product with a newer version of the product. The addition of marketing material, including changing of existing marketing material, can be subject to restrictions, such as authorization by the user associated with the capturing of the video or audio content, rules of the community, and so forth. The original images without the marketing material adjustments can be retained by the server 130, the STB 106 and/or the computing device.

The adjustment to the image can be based on marketing information provided by a commercial entity. In one embodiment, the adjustment to the image can include adding marketing material to an area of the image that did not previously include marketing material. For instance, the image can be adjusted by adding a bottle of soda of a particular brand on a table in personal content that is based on a virtual dinner for a family, where two or more members of the family are located at different locations. The server 130, the STB 106 and/or another computing device can utilize image recognition for intelligently adding the marketing material, such as recognizing that the image includes a table where there are no beverages being shown and adding the bottle of soda accordingly.

The STB 106 can be adapted with software function 164 to further utilize the services of the server 130, as well as to enable the generation and coordination of personalized content. For example, the STB 106 can be adapted to execute software functions 164 to access personal content stored in a cloud computing environment coupled with the server 130. As another example, the software functions 164 can include image and/or audio recognition to determine content segment subject matter and selection of appropriate pre-recorded content segments based on the determined subject matter.

In one embodiment, marketing content to be added to the image or to replace other marketing content already in the image can be selected by the server 130, the STB 106 and/or another computing device based on demographic information that is representative of a subject matter of the personal content and/or based on monitoring of access to the personal content delivered via the personalized media channel.

In one or more embodiments, different users at different locations can provide portions of the personal content (e.g., video and/or audio segments that can be real-time and/or pre-recorded) that can be adjusted and delivered to a user via the personalized media channel. For example, a first user 151A at a first location 149A can generate portions of personal content, including pre-recorded video and/or audio content. A second user 151B at a second location 149B can generate portions of personal content, including pre-recorded video and/or audio content. The pre-recorded content can be generated based on a known subject matter for an upcoming communication session with another user. For instance, the first and second users 151A and 151B can pre-recorded video and audio segments based on a scheduled virtual breakfast with a third user 152 at location 102. The pre-recorded segments can cover topics that are anticipated to be discussed during the virtual breakfast. As an example, a guideline (e.g., a list of questions or topics) can be generated by the STBs 106 at locations 149A and 149B so that the first and second users 151A and 151B can record video and audio content that corresponds with the anticipated topics. The guidelines and/or the anticipated topics can be determined and generated by the server 130, the STBs 106 and/or other computing devices based on a number of factors, including determined subject matter from past communication sessions with the third user, current events as monitored by the devices, scheduling information associated with the users, or other information associated with the first, second and/or third users that is utilized to identify a likely topic of discussion during the upcoming virtual breakfast.

In one or more embodiments, the content captured at locations 151A and 151B can be adjusted and presented to the third user 152 via the personalized media channel at display device 108 of location 102. The adjustment of the personal content can be performed in a number of different ways. As an example, images and/or audio content can be combined or otherwise manipulated to simulate the first and second users 151A and 151B being present at a single location. In another embodiment, the single location can simulate the location 102. As an example, graphics can be added to the personal content to simulate the single location, such as location 102. For instance, a table 151C that matches the furniture at location 102 can be added as graphics to simulate the first and second users 151A and 151B sitting at the table eating breakfast with the third user 152.

During the communication session, the third user 152 can state something or can make a particular movement which is captured by the sensor in communication with the STB 106 (e.g. video camera 191). The captured video and/or audio content of the third user 152 is reaction information that is representative of a reaction by the third user to the presentation of the personalized content and that can be analyzed for determining an appropriate response. In one or more embodiments, trait information associated with the first and second users 151A and 151B can be accessed or otherwise obtained. The trait information can indicate traits of a user that are indicative of responses that the user would likely provide to a given question or statement. The trait information can include interests of the user, intelligence of the user, topics of expertise, shyness and so forth. In one or more embodiments, the reaction information can be analyzed to determine a response, where the response is determined based at least in part on the first and second trait information. The response can then be selected from the pre-recorded segments of one or both of the first and second users 151A and 151B based on a comparison of the determined response with a previously determined context for each of the pre-recorded segments. The personalized content can then be adjusted to include the selected pre-recorded segment(s).

The trait information can be used for identifying a user that would likely respond to the reaction of the third user 152, as well as identifying a pre-recorded segment of that identified user. For example, reaction information from the third user 152 can be analyzed to determine a statement from the third user indicating a desire to go to the beach during the summer. The trait information of the first user 151A can indicate that the first user is very concerned about the third user's health and her safety when travelling. The pre-recorded segments may not include a segment that is directly related to a visit to the beach, but may include a general segment in which the first user 151A questions whether her plans are wise. The trait information can be used to identify that the first user 151A would likely object to a trip to the beach and can further be used to identify and select the general segment questioning the wisdom of her plans.

As another example, the captured content of the third user can be analyzed to identify that the third user 152 asked about when her grandson will begin college. A pre-recorded segment can be identified that was generated by the first user 151A (who is the father of the grandson) indicating that the grandson is doing well and preparing to leave in the fall for college. Continuing with this example, another pre-recorded segment can be identified that was generated by the second user 151B (who is the aunt of the grandson) indicating that she recently visited with the grandson and he is very excite about going off to college. The selection and order of presentation of pre-recorded segments can be made to simulate a conversation between the third user 152 and the first and second users 151A and 151B.

As yet another example, the captured content of the third user 152 can be analyzed to identify that the third user was wearing a bandage on her arm or sitting awkwardly. Image recognition applied to the captured video content can detect the bandage without the third user 152 describing the bandage or can detect the third user's unusual posture based on sample images of the third user's typical posture while sitting. A pre-recorded segment can be identified from the first user 151A asking if she in OK. The pre-recorded segment can be added to the personalized content to steer the conversation towards the health of the third user. It should be understood that the pre-recorded segments can be made specific, such as based on particular known conditions of the third user and/or can be kept generic, such as generally asking how the third user is feeling.

In one or more embodiments, the exemplary embodiments can be used to obtain reaction information from the third user 152 that is utilized for reporting a status of the third user. For instance in the examples described above, the selection of the pre-recorded segment asking whether the third user 152 is OK may elicit a description of an event in which the third user fell. The description can be audio content of the third user 152 that is captured by the video camera 191. An analysis of the captured audio content by the server 130, the STB 106 and/or another computing device (e.g., via one or more of audio recognition, parsing, natural language engines, rhetorical topic libraries and so forth) can determine that the subject matter of the reaction information (e.g., the captured audio content) indicates that the third user 152 has hurt herself in a fall. A notice can be generated and provided to appropriate parties by server 130, the STB 106 and/or another computing device, including the first and second users 151A and 151B, as well as other entities, such as a caregiver. In one or more embodiments, a status report for the third user 152 can be delivered utilizing presence information associated with one or both of the first and second users 151A and 151B.

It should be understood that the particular device that performs the analysis of the pre-recordings and the reaction information, as well as the adjustment to the personal content can vary and can include the server 130, the STB 106, another computing device and/or a combination of these devices, such as in a shared function configuration. It should be further understood that the exemplary communication sessions described herein can include any number of parties and is not limited to first, second and third users.

In one or more embodiments, the addition or adjustment of marketing material in the personal content distributed via the personalized media channel can be utilized as a basis for providing incentives to one or more members of the community. For example, pre-recorded segments or other generated content of a first member of the community delivered via the personalized media channel in which the first member provides a cooking tutorial can be adjusted with marketing material related to cooking products. The selection of the cooking tutorial content in this example can be based on a popularity of the content which is monitored by the server 130, the STB 106 and/or another computing device. A commercial entity selling the cooking products can provide a financial incentive to the first member based on presentation of the cooking products and/or based on purchases of the cooking products, such as where the purchase is over the Internet via a link provided in the personal content. In one or more embodiments, the commercial entity can provide other financial incentives to the community based on the presentation of the marketing material, such as providing a discount on purchases of the cooking products for members of the community.

Communication system 100 can also employ IP Multimedia Subsystem (IMS) network architecture to facilitate the combined services of circuit-switched and packet-switched systems.

Figure 2:
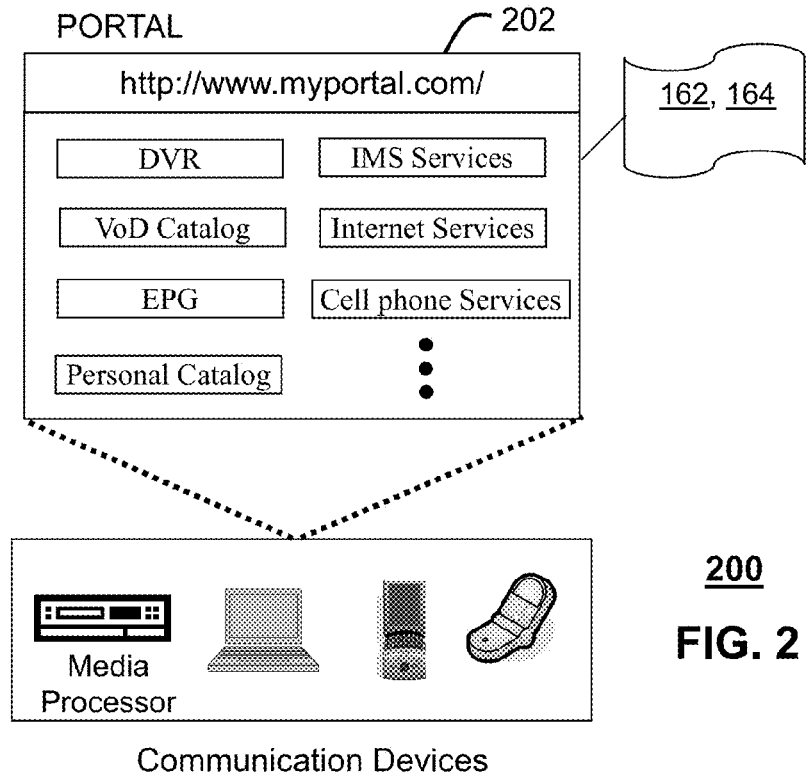
FIG. 2 depicts an illustrative embodiment of a web portal for interacting with the communication system of FIG. 1.

FIG. 2 depicts an illustrative embodiment of a web portal 202 which can be hosted by server applications operating from the computing devices 130 of the communication system 100 illustrated in FIG. 1. The web portal 202 can be used for managing services of communication system 100. A web page of the web portal 202 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIG. 1. The web portal 202 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 202 can also be used for provisioning IMS services described earlier, provisioning Internet services, provisioning cellular phone services, and so on.

It is contemplated by the present disclosure that the web portal 202 can further be utilized to manage and provision software applications 162 and 164 of the devices of FIG. 1, respectively, as described earlier. In one embodiment, web portal 202 can be utilized for selecting preferences associated with personal content, such as obscuring inappropriate content or automatically updating or removing marketing material on objects in the images. Other preferences can also be selected via the web portal 202, such as desired viewing angles for the images, desired viewing distances and so forth.

In one or more embodiments, portal 202 can be used to provide and/or review pre-recorded segments that are utilized in a virtual communication session with another user as described in the examples of system 100. In one or more embodiments, the portal 202 can be utilized to access the personalized media channel to view personal content being provided via the channel. In one embodiment, a user that has provided pre-recorded segments for use in a virtual communication session can monitor the session or portions thereof, such as the first or second user viewing captured reaction information of the third user as described in the examples described herein.

In one or more embodiments, the portal 202 can be used for provisioning one or more processing devices for performing the various functions described with respect to system 100. For example, portal 202 can be used for providing image and/or audio samples of a user that can be used in recognition analysis (e.g., for authentication). The portal 202 can also be used for providing user preferences, such as filtering options for the personal content, as well as providing other information, including demographic information, trait information, and so forth.

Figure 3:
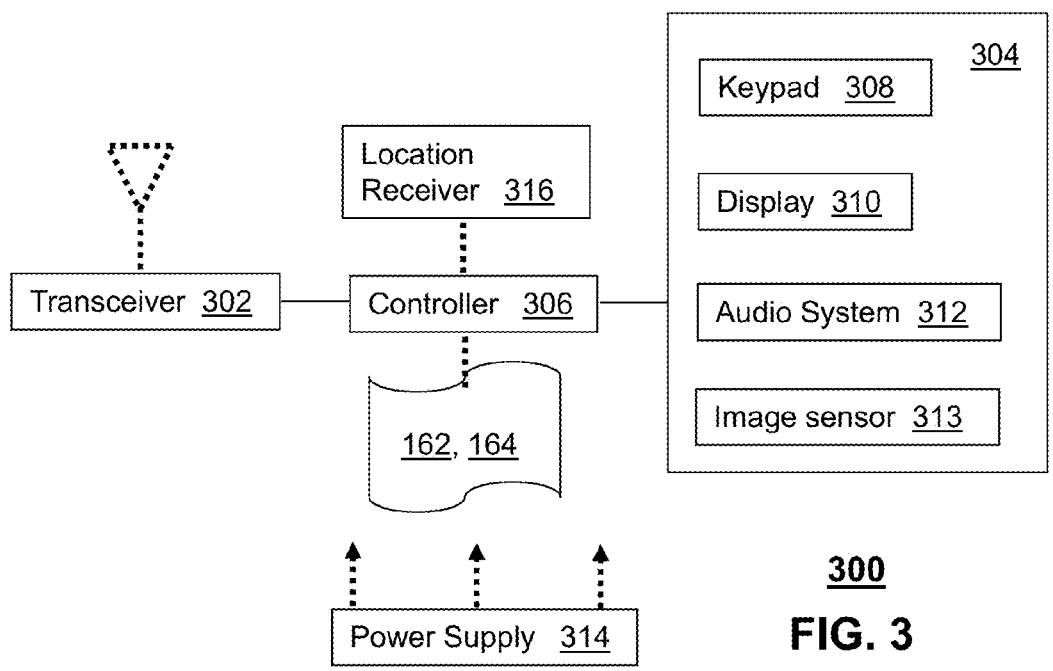
FIG. 3 depicts an illustrative embodiment of a communication device utilized in the communication system of FIG. 1.

FIG. 3 depicts an exemplary embodiment of a communication device 300. Communication device 300 can serve in whole or in part as an illustrative embodiment of the devices depicted in FIG. 1. The communication device 300 can comprise one or more of a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), RF communications or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, a joystick, a mouse, or a navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display 310 with navigation features.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver capable of assisted GPS for identifying a location of the communication device 300 based on signals generated by a constellation of GPS satellites, thereby facilitating common location services such as navigation.

The communication device 300 can use the transceiver 302 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such as Flash, ROM, RAM, SRAM, DRAM or other storage technologies.

The communication device 300 can be adapted to perform the functions of the media processor 106, the media devices 108, or the portable communication devices 116 of FIG. 1. It will be appreciated that the communication device 300 can also represent other common devices that can operate in communication system 100 of FIG. 1 such as a gaming console and a media player. The communication device 300 can be provisioned with, or otherwise have access, to all or a portion of the software functions 164 to enable the communication device 300 to communicate with the server 130, the STB 106 and/or the cameras 191 for capturing images and/or audio content associated with the users. In one embodiment, software can be disabled or removed automatically upon expiration of a community membership or otherwise withdrawal from a community. For example, a subscriber may obtain a service plan that enables membership in a first community for a fixed period of time. Upon expiration of the time period, the software that enables the capturing of the audio and/or video content, the recognition analysis, the personal content adjustment and/or the access to the personalized media channel can be disabled or automatically removed from a memory of the communication device (e.g., the STB 106) without user intervention.

Illustrative embodiments of methods that can operate in portions of the communication device of FIG. 3 are described below.

Figure 4:
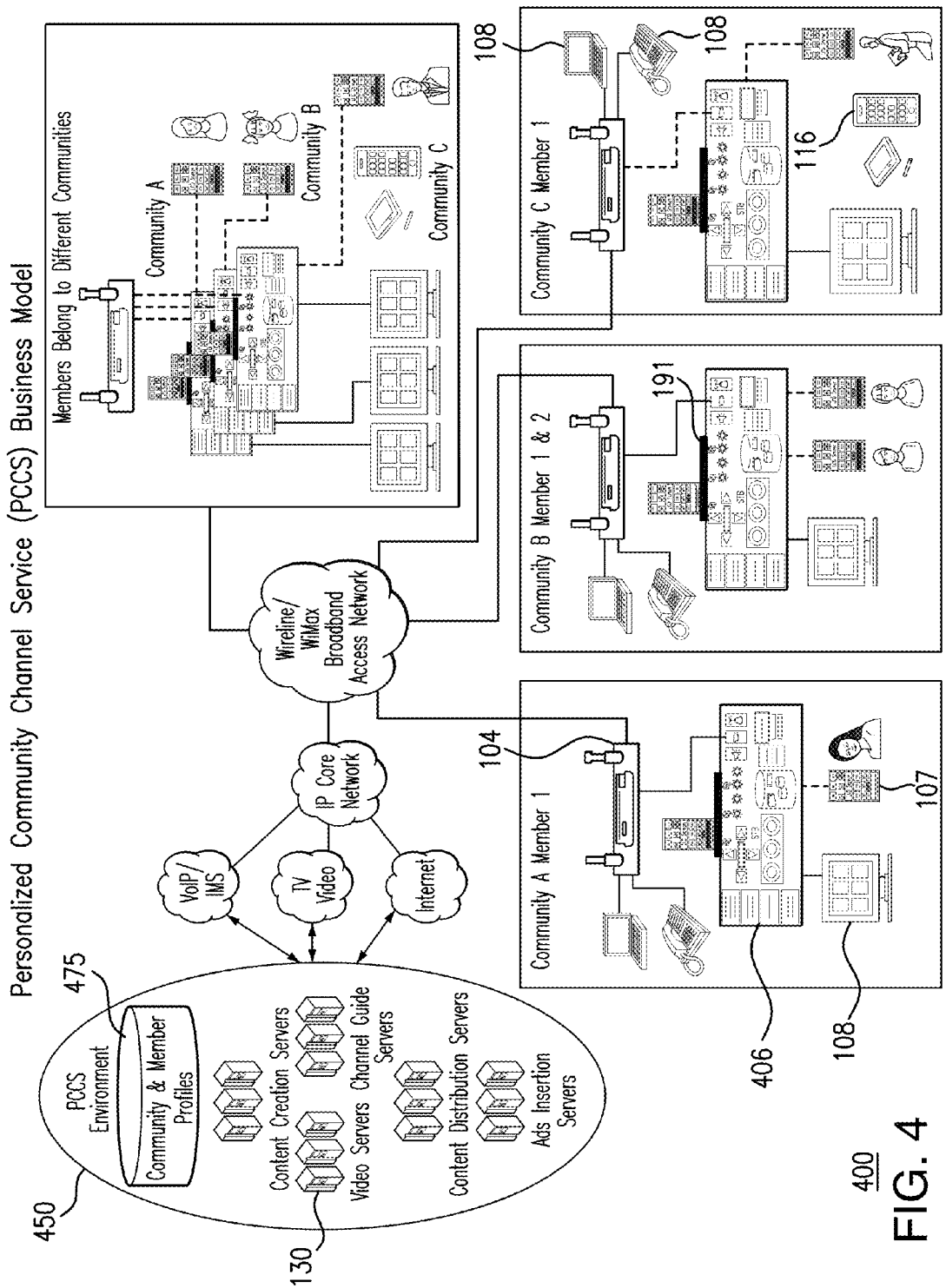
FIGS. 4 and 6 depict illustrative embodiments of other communication systems that provide content.

FIG. 4 depicts an illustrative embodiment of a system 400 for generating and delivering personal content. System 400 can be overlaid or operably coupled to communication system 100 as another representative embodiment of communication system 100. System 400 enables delivering personalized media channel(s), rather than being limited to pre-packaged channel offerings.

In one or more embodiments, personalized community channel services can be offered to a subscriber or a community. For example, personalized community channel services can be offered to allow family members to interact with, and/or take care of, elderly residents in a nursing home or children in a boarding school, or other communities such as an investment club or a special interest community (e.g., music, sports, hobbies, etc.). In the exemplary embodiments, the personalized community channel services can provide access to content that correlates with the specialized interests of certain communities.

In one or more embodiments, system 400 can integrate IPTV, Cable TV, teleconferencing, monitoring, video sharing, artificial intelligence, and/or virtual reality technologies to provide personalized channel services (including personalized programming) to subscribers or special communities with a common need.

For example, video service providers operating in system 400 can allocate a predefined set of channel line-ups for personalization purposes (e.g., channel numbers between 6000 and 8000). The allocated channels can be provided to communities and/or individual subscribers for offering their own programming of choices. The programs of these channels can be viewed by the special community group members of IPTV/Cable TV/Internet TV subscribers. In one or more embodiments, non-subscribers in the community can also participate in some programs, such as participating in a voice only conference call. These allocated channels can be unicast or multicast via a service provider's distribution channel. In one or more embodiments, revenue sharing can be implemented, such as based on personalized content being broadcast to viewers outside of a pre-defined community with the consent from the content creator(s).

In one or more embodiments, a service provider can use the offering of the personalized media channel services to encourage competition in developing personalized channels/contents by the subscribers, such as to allow or develop a sense of customer ownership. Video service providers can enable individual subscribers and/or communities to determine membership. For example, membership in a community can define only the accessible personalized channels or can define combination of general channel line-ups in combination with the accessible personalized channels.

In one or more embodiments, the availability of each channel with its content can be controlled by one or a group of community members. Conflict resolution and negotiation rules can be put in effect to enable adjustments to the availability of the channel, such as community voting, which may or may not be weighted based on criteria of a member (e.g., a founding member of a community having a more heavily weighted vote than a non-founding member of the community). In one or more embodiments, Role Based Access Control (RBAC) can be managed by the community lead for providing customized access control.

In one or more embodiments, system 400 can provide an integrated TV (e.g., IPTV, Cable TV, Satellite TV) management platform for a group of members of a community, such as closely related members.

In one embodiment, the master controllers/owners of a personalized community can use the TV management platform to manage all members' local channel line-ups and associated programs. This TV management platform can be accessed via TV remote controllers (e.g., smart remotes, or mobile devices (e.g., smartphones and tablets). Voice activated control for selecting TV contents from local or remote sources can be utilized with system 400. In another embodiment, a group of members can together manage a set of members' local TV channels/programs interactively and simultaneously.

System 400 can utilize an intelligent community aware STB 406. STB 406 can differentiate personalized channels from service provider provided channels. System 400 can provide for STB to STB to mobile device (e.g., smartphone/tablet) communications to be enabled and tracked within the same wiring infrastructure. System 400 can also provide for STB to STB to mobile device communications via the "Cloud" to be supported. Different sensors, such as augmented reality cameras, can be modularized components for various STB configurations depending on different use cases. In one embodiment, STB 406 can support multiple communities within the same wiring infrastructure.

System 400 can also utilize a simplified remote control or touch screen TV interface. For example, a group of specially classified STBs, Remote Controls, and/or TVs can be supported to adapt to different uses. In one embodiment, simplified menus for remote control units, STBs and/or TVs can be presented with limited keys (e.g., no more than 5 touch screen buttons) or simple voice activated commends to ease the use for community members. Artificial intelligence technology can be used to offer virtual agents (e.g., an avatar), recommendations, and/or personalized services in assisting certain community members to navigate through the channels and/or programs.

In one or more embodiments, a community member in system 400 can provide configuration settings in a web portal or an IPTV application, and/or can train a virtual agent to have knowledge about the community or the member(s). For example, the virtual agent can be operating from the STBs 406 and/or operating from the server(s) 130 such as in a server farmer 450. In one embodiment, accessible information associated with the members and/or the communities can be stored in profiles in a database 475, such as community profiles and/or user profiles. The virtual agent can be an avatar that is customized, such as to resemble family or friends of the user (e.g., having similar facial and voice features). In another embodiment, the same avatar is utilized for all members of the community or all members of the community that are located at the same location. In yet another embodiment, the virtual agent can provide recommendations for the community member's needs based on the circumstances at the time, such as through information describing user preferences. As an example, the virtual agent can automatically turn on a special TV program for a community member (e.g., an elderly member) or to remind the member to take medicine, or to notice other family members when there is an emergency associated with the member.

System 400 can support a personalized community channel service by leveraging various technologies such as IPTV or cable TV, tele-conferencing, monitoring, video sharing, artificial intelligence, and/or virtual reality. System 400 can provide a new generation of personalized community channels with associated content to general subscribers or special communities with a common interest. In one embodiment, the decision of which content to generate or otherwise create, use, distribute, and/or share (e.g., timing) can be controlled by the end user member and/or a lead community channel participant(s) (e.g., a designated lead member) without service provider control.

In one or more embodiments of system 400, the service provider can allocate a preset number of channels to support personalized community channel services where the personalized community channels are assigned to a class type. Some example of class types can be shared, dedicated, secured, and so forth. In one embodiment, when channels are allocated to one personalized community with a class type of dedicated, the community will own this channel and pay a fee even though the channel is not in use. In another embodiment, when a channel is assigned with a shared class type, the channel can be shared by multiple communities (e.g., based on a time of the day). In another embodiment, when a channel is assigned with a secured class type, the content of the secured channel will not be shared with members outside of the community.

In one embodiment, although the service provider may allocate a different set of channels in different market segment in support of the personalized community channel service, community members across the market segments can see a consistent personalized community channel line-up. A channel remapping feature can be utilized by the service provider. In another embodiment, a community lead can be provided with control to assign different profile classes to each member of the community or an entity that is being provided access to community channels. In one embodiment, the community lead can dedicate this authority to another participant or can permit co-lead status for multiple members.

In one or more embodiments, system 400 can enable content or a portion thereof for the community channels to be created or otherwise generated by the lead or other members in the community, such as members designated by the community lead. In one embodiment, community members may elect to share partial or all of the contents to the public. In this example, a service provider can have the distribution right and a revenue sharing model (e.g., with the community and/or with selected community members) can be supported, including revenue sharing related to advertisement insertion.

In another embodiment of system 400, some communities may elect to be in a silo mode of distribution and can provide limited external distribution, such as through a scheduled event with multiple local communities or charters of a single community joining in the event. In this example, channel merging and/or sharing to enable these activities is provided for by server 130 of system 400. System 400, through use of the personalized community channel service, can support prerecorded and/or real time events.

In one embodiment, system 400 can provide an integrated personalized channel service management platform whose functionality locates in the central server (e.g., server 130) and/or local STBs. For example, in a central site 450, personalized content creation servers, personalized video servers, personalized channel guide servers, personalized content distribution servers and/or personalized advertisement insertion servers can be supported to enable content creation, storage, distribution, and so forth. A community profile database 475 can be supported which stores profiles and authorization information for all communities and their associated members. In one embodiment, a subset of the functionality can be supported in a DVR-based STB. In one embodiment, some content manipulation can be performed at the local level. For example, a community lead may create a group of content and push the content to members' DVRs, such as prior to a scheduled distribution. The STB can merge commercial channel line-ups with personalized virtual channel line-ups (e.g., the central server 130 may not need to know personalized channels are running at the STB level) and present to the members' TV sets. In this example, virtual reality and artificial intelligence, along with sensor technologies, can be utilized to add predictive and auto recommendation one touch capabilities. In one or more embodiments, smartphone or tablet interfaces can be included to add another level of flexibility when dealing with the content creation, consumption, distribution and/or management activities. Remote controllers 107 can be enhanced to support a software driven architecture. For example, in this architecture, all or some of the keys can be soft keys and can be reconfigured to support different members' needs. In one or more embodiments, all or some of the STBs can support multiple, rechargeable remote controllers, including simultaneous use of the remote controllers. This can enable interactivity during the content creation, among other benefits In one or more embodiments, system 400 can provide for revenue sharing or other financial incentives based on the growth of a community and/or based on a member's contribution to the growth of the community. In one embodiment, new members can be sponsored or otherwise associated with existing members that can result in a reward provided to the existing member for the new membership. The reward can be in many forms including a discount on services, additional services, revenue sharing (e.g., based on revenue from marketing materials), and so forth. In one or more embodiments, the STB 406 can present an indicia of community shares or other revenue sharing criteria for a user, such as based on the number of new members that are contributed to the existing member. In another embodiment, use of personal content attributable to a member for marketing purposes, such as a cooking tutorial generated by a member or an avatar resembling a more popular member, can be utilized for revenue sharing or otherwise to provide incentives to the member.

Figure 5:
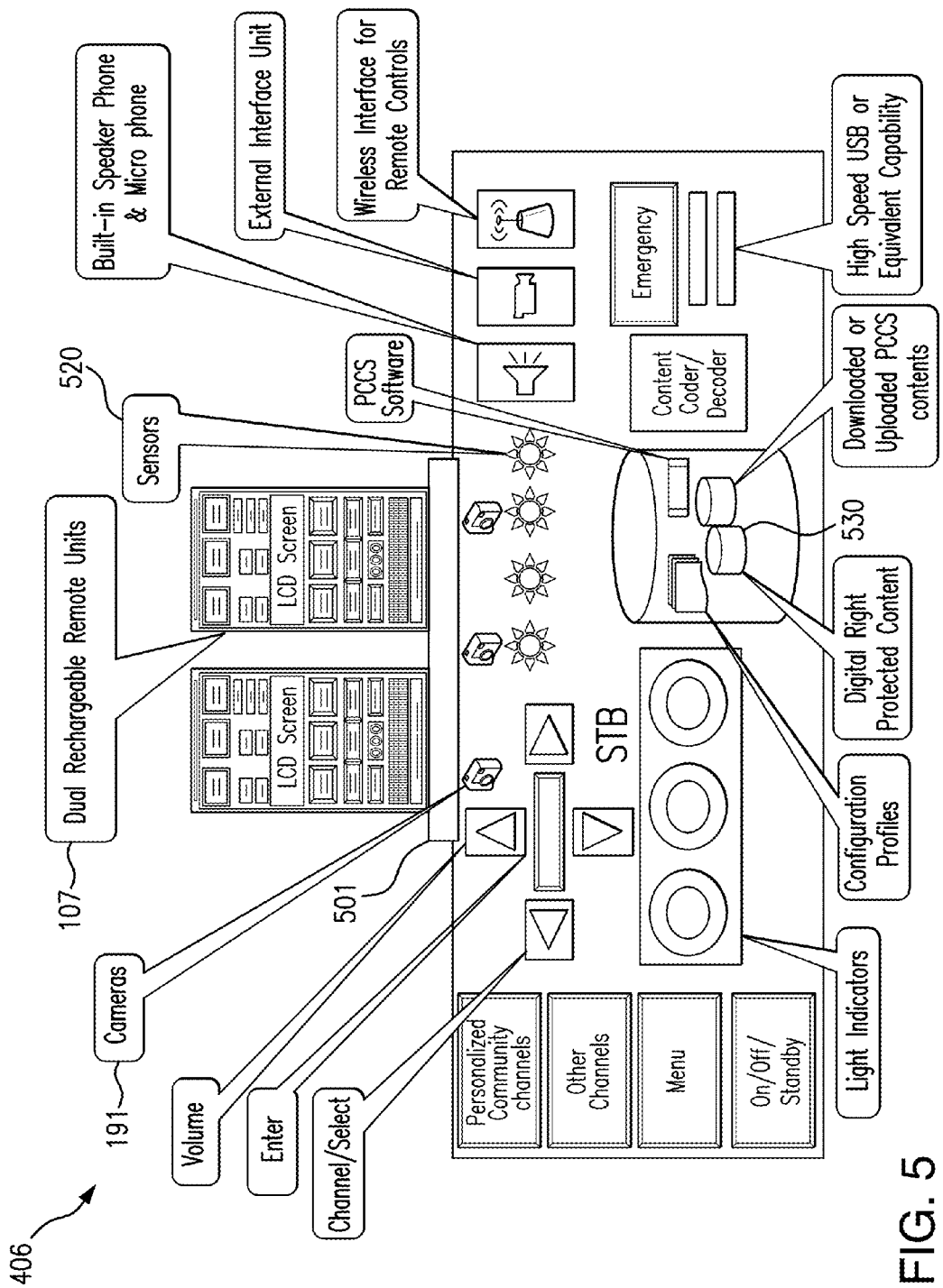
FIG. 5 depicts an illustrative embodiment of a media device that can be used in the communication systems of FIGS. 1, 4 and 6.

FIG. 5 depicts an illustrative embodiment of a media device or set top box 406 that can be used with the exemplary embodiments described herein. STB 406 can be used in place of STB 106 or in addition thereto in the exemplary embodiments described herein. In one embodiment, each STB 406 can include rechargeable remote controller slots or ports 510 that enable placement and recharging of the remote controllers 107. The remote controllers 107 can be used for interactivity by different members at the same time with a single STB connection. While two remote controllers 107 are shown, the exemplary embodiment can include any number of remote controllers and any number of recharging slots 510.

In one or more embodiments, the STB 406 can include integrated cameras or other images sensors 191 which are used for capturing video content, such as for monitoring and video conferencing capabilities or video content creation. In another embodiment, external cameras can also be utilized, including external cameras that are in wireless communication with the STB 406.

STB 406 can include integrated sensors 520 (e.g., motion, sound, force, and/or time sensors) to capture and predict the members intentions, as well as to capture information regarding the environment of the member. For example, a time sensor 520 can be used to automatically play a prerecorded program or establish a video call.

STB 406 can include a DVR 530 for members to create or store content. The DVR 530 can also store lead/participants created content in some members' home STBs. For instance, some of the virtualized personalized channels can reside locally and be integrated with regular channels by the STB). The STB 406 can include software that maps different source/technology initiated communications to a different real estate or portion of the TV screen. The STB 406 can also provide off-network content creation and/or editing capabilities.

In one or more embodiments, the STB 406 can analyze video and/or audio content that is captured by the camera 191. The captured content can be analyzed to determine subject matters for different segments of the video and audio content. The STB 406 can separate the different segments based on the determined subject matters and can generate metadata that indicates the determined subject matter for each of the different segments of the video and audio content. The STB 406 can provide the metadata and personalized content generated from the captured content to a service provider, such as server 130, for delivery to other STB's. The personalized content in this exemplary embodiment can be delivered via the personalized media channel and can be configured for presentation in different portions of a display of another set top box based on the metadata that indicates the determined subject matters.

Figure 6:
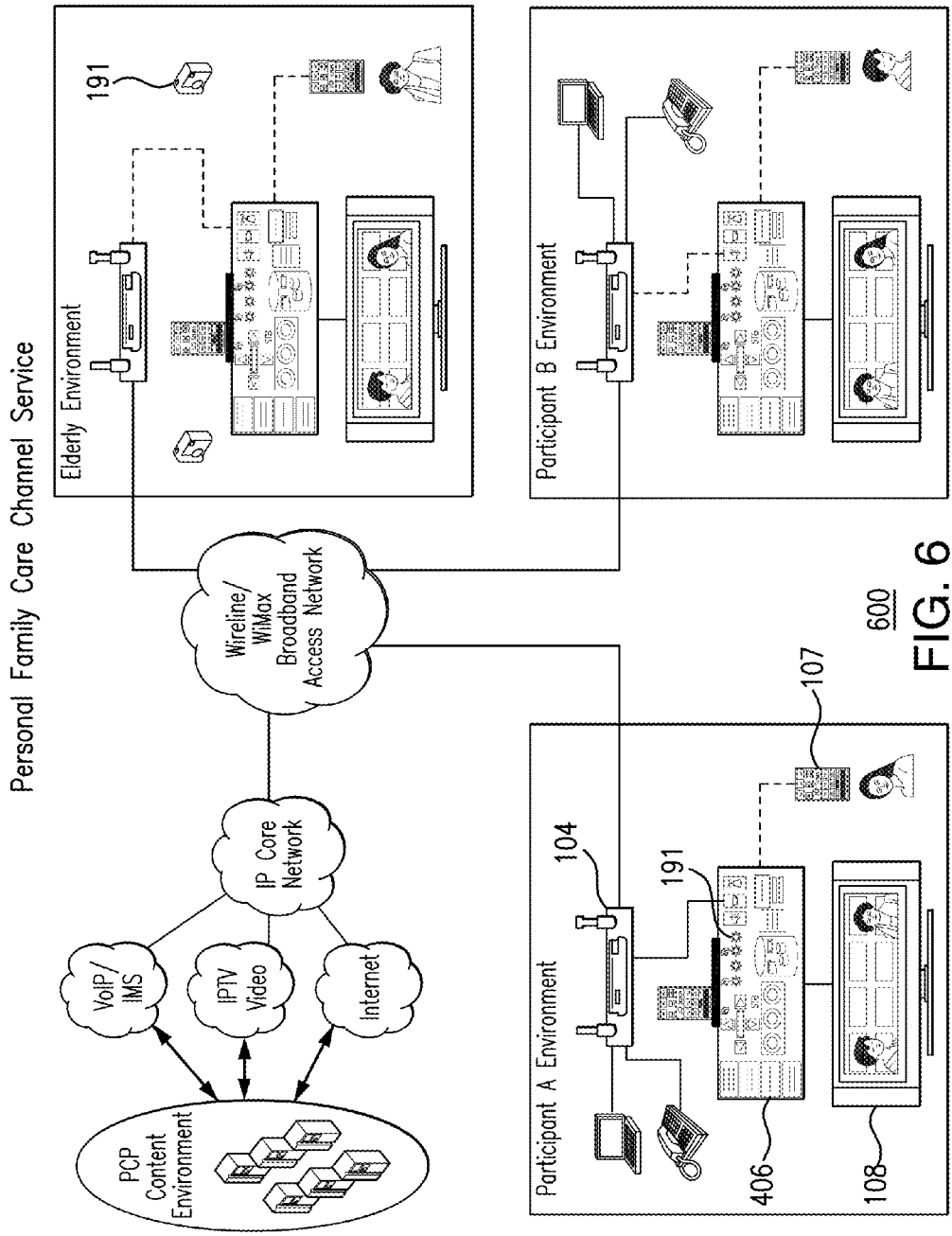

FIG. 6 depicts an illustrative embodiment of a system 600 for generating and delivering personal content. System 600 can be overlaid or operably coupled to communication systems 100 and/or 400 as another representative embodiment of communication systems 100 and/or 400. System 600 illustrates an example of end to end architecture of an end to end Personal Family Care Channel Service (PFCCS). STB 406 can map a piece of real estate on the TV screen with different content. For example, regular programming or pre-recorded personal family contents may be mapped to a set of slots or regions on the TV screen while a real time video conferencing call may be mapped to a different slot or region on the screen. The service provider can offer a PFCCS environment where capabilities such as members' content uploading, editing, creating (including recording of video clips from PC at home or at a studio at the provider's location) and/or distributing are offered to all family participants.

In one embodiment, the PFCCS of system 600 can be offered to families who have elderly member(s) living in a remote location. In the elderly member's residence, TV service can be subscribed. System 600 enables a. TV to be turned on/standby mode/off automatically via an Advanced STB Sensor Control System (ASSCS). ASSCS enables the STB 406 to automatically turn on/off the TV, tune to special channel control in the remote destination, turn on the video monitoring control system and/or send out alerts based on motion or sound detected, as well as based on time sensors, which can embedded in the STB 406. For example, a TV may be turned on or off via a command to STB 406 from a remote location by a family member. In another embodiment, in a monitoring mode, when unusual motion or sound is detected, the STB 406 can start the monitoring functions with video recording session, and alert family members based on pre-configured settings. Regular power on and off functions can also be provided for the STB 406 and/or TV.

The PFCCS of system 600 can include one or more personalized channels. For example, all or some of these channels can be aggregated and displayed on a TV screen together via split screen technology or other techniques. For instance, if a member has three children at three separate remote locations and all of the children decide to participate in one of the personalized channels, the member can see three split screens on his or her TV via the STB 406. If live video sharing is enabled, the member can see live video feeds from these three family members at that same time. The video share can be in real time and/or pre-recorded. Prerecorded video clips can be played in one or more of these channel screens. The service provider can offer a programming environment to PFCCS participants. Each participant can create, upload, edit and/or publish content (e.g., a video clip) in real time and can determine when such video clips need to be seen in the member's residence. For example, the child member may create a program to eat with an adult member virtually at 7 a.m. the next morning. The child member may create the program at 9 p.m. the previous evening and publish and push to the adult member's STB 406 at 9:45 pm. The child member can set the timer to activate this video clip automatically at 7 a.m. In this example, the TV will be turned on automatically at 7 a.m. and the eating program will be delivered via the personalized media channel and displayed on the TV via the STB 406.

System 600 provides a content creation environment with the capability to create interactive programs. For example, an adult member may be permitted to vote whether or not one of the grandsons should purchase a pet. Another example is to use advertisement insertion capability so that the adult member can watch family commercial messages that are generated by the family members. One of such messages may be a granddaughter selling Girl Scout cookies to the adult member who can utilize faux TV currency to pay for the cookies.

Other non-family members (e.g., friends, care givers, doctors, and so forth) may be invited to join (e.g., as an expanded community) based on being identified in a pre-specified profile with allocated time slots or joining in real time. When family members are travelling, a GPS location integration feature can advise an adult member where they are physically located in a given moment, such as based on an opt-in for a location feature. Pre-recorded programs, including video or audio clips or real time content can include exercise, meals together, gaming together, family news room, medicine schedules, kids piano playing, scenery, messages of affection, family album shows, old wedding video, and so forth.

System 600 can include reporting capabilities. For example, system 600 can determine how many times particular clips have been viewed (e.g., tuned to on the TV by the user) and how long the channel is on (e.g., used for discerning favorite video clips from non-favorite video clips). This information can be provided back to the member that generated the content as feedback for producing more favorable or desired video clips.

In one embodiment, the PFCCS of system 600 can be integrated with or otherwise include a home monitoring or care alarm system. This can enable family members to get alerts at the same time the service providers (e.g., monitoring or care providers) receive the alerts. In one embodiment, the alert may be a text message to a cell phone, a message on the screen of the member's TV, and/or audio beep sound in a member's TV, STB, remote controller, and so forth.

In one or more embodiments, virtual reality features can be triggered or otherwise implemented. For instance, instead of utilizing split screen displays, an icon representation of all the participants from different locations can be mapped to a single room, such as taking seats at a single table so that the adult member will feel that all the children are present at the home location. As an example, the icons can be avatars that are generated in the likeness of the other family members. The avatars can interact with the adult member, including having conversations with the adult member. Images and audio from the adult member can be captured by the STB 406 and analyzed in order to generate audio from the avatars that is responsive to statements made by the adult member. In one embodiment, trait information for each of the family members can be utilized by the STB 406 in the generation of audio provided by the avatars.

In one or more embodiments, when a member is in a particular mode setting, such as a remote monitoring mode, a single button on the remote control can establish an audio or video direct call with the adult member. The remote controller at both locations can act as an audio communication device to enable push-to-talk service. In one or more embodiments, program sharing capability can be provided so that the same program is watched at two or more locations while voice and/or video conference communications are in effect among all of the viewing locations.

In one or more embodiments of system 600 each of the STBs 406 can include or otherwise be in communication with multiple video cameras 191 that can focus on different angles. In one embodiment, zooming or angle changes of a camera 191 can be done by a remote command provided to the STB 406.

Figure 7:
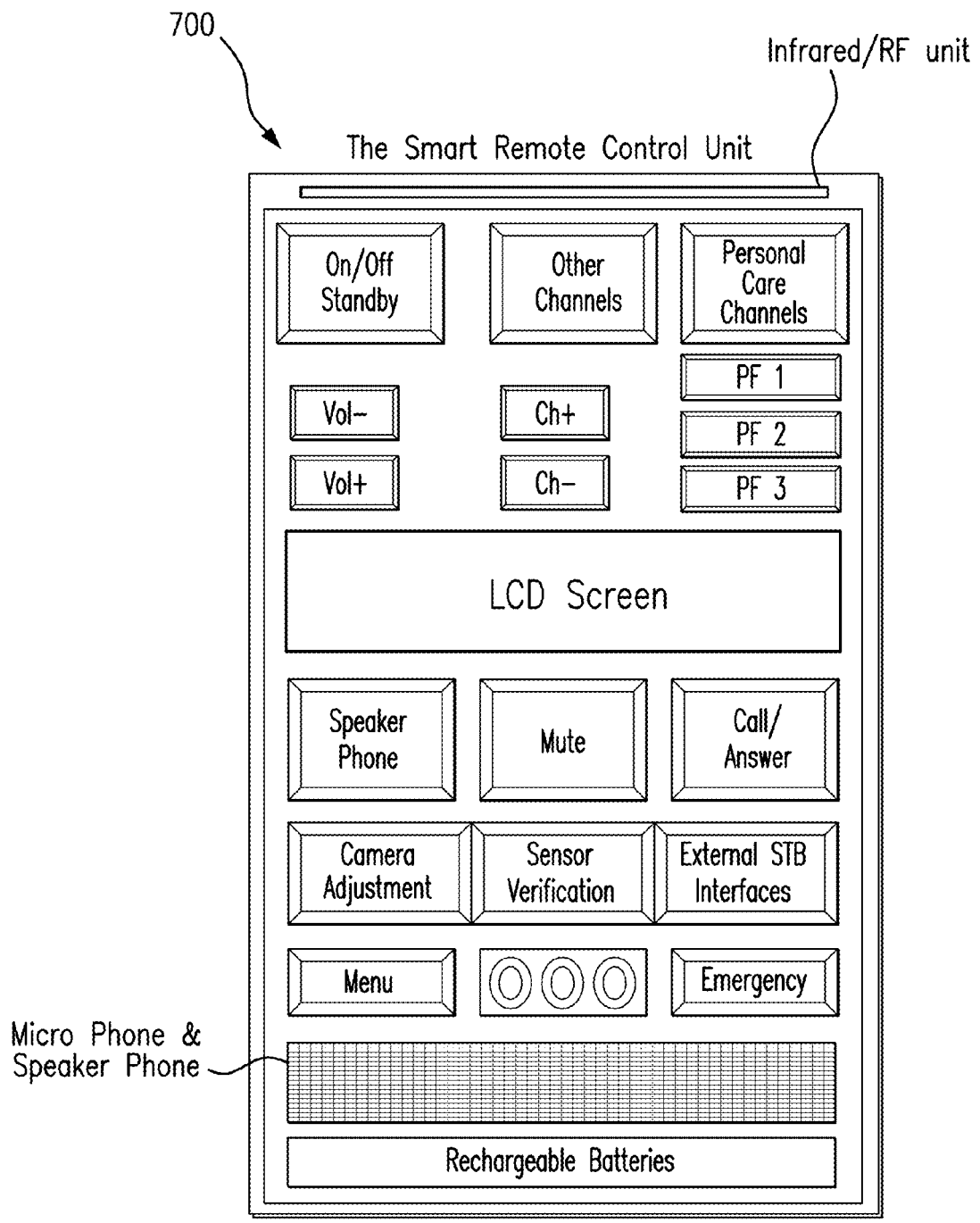
FIG. 7 depicts an illustrative embodiment of a remote controller that can be used in the communication systems of FIGS. 1, 4 and 6.

FIG. 7 depicts an illustrative embodiment of a remote controller 700 that can be utilized with the media device or set top box 106 and/or 406. The remote controller 700 can be a rechargeable device, such as via the recharging slots 510 of STB 406 (shown in FIG. 5). The remote controller 700 can provide voice communications, such as when the call button is pushed. In this embodiment, the STB 406 can be a receiver for the cellular voice functionality of the remote controller 700. When the personal care channels button is pushed, access can be provided to programs on the personalized media channel(s) of the community. Other keys of the remote controller 700 can be pre-configured with functions, such as the PF keys being pre-configured with speed dial functions. For instance, PF1 can be pre-configured for a child member and when it is pushed, a prerecorded program generated by the child member can be mapped to a select region of the TV screen for viewing. In other embodiments, functions can be implemented via a software download to the remote controller. In another embodiment, smart phones can function as the remote controller 700 via software application downloads that provide functionality described herein in combination with the STB 406.

In one or more embodiments, the remote controller 700 can be a touch sensitive screen where the keys are configured for the member utilizing the controller. For example, an image or a voice recording can be captured by the STB 406 and analyzed to identify and authenticate the member for use of the remote controller 700. The authentication can be based on membership in one or more communities that allow for use of services that include utilizing the remote controller 700 and the STB 406. Once the member is authenticated, the remote controller 700 can display a pre-configured touch sensitive screen with buttons for manipulation of the personal content services. The pre-configured settings of the remote controller 700 can be retrieved from a user profile stored at the STB 406.

Figure 8:
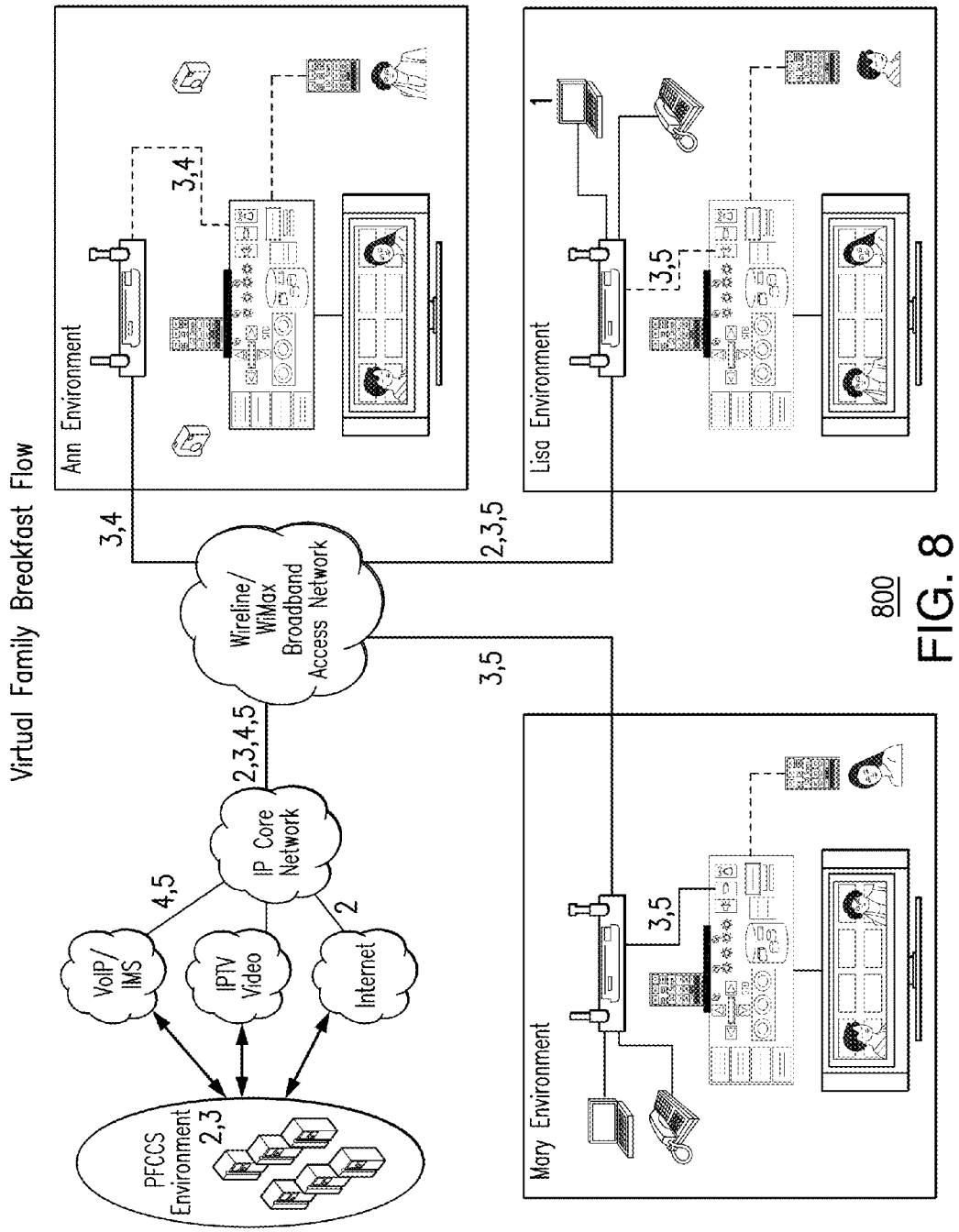
FIG. 8 depicts an illustrative embodiment of a process flow for one or more of the communication systems of FIGS. 1, 4 and 6.

FIG. 8 depicts an illustrative embodiment of a processing flow 800 that can be used with one or more of the exemplary embodiments described herein, including systems 100, 400 and 600. In this example, Ann is an 80 old mother living alone. Lisa and Mary are her 40 year old daughters living remotely from Ann. Lisa and Mary agree to have regular virtual breakfast together every Saturday morning.

In step 1, Lisa uses her laptop computer to access PFCCS environment to create a breakfast together program. In step 2, Lisa uploads her cooking video from her laptop and uses the editing software in the PFCCS to associate advertisement insertions to create some interaction points. Lisa also uses the scheduling function in the PFCCS to schedule a video conferencing call from Ann's home to Lisa and Mary's homes at 7 a.m. on Saturday.

In step 3, Lisa's program is downloaded to Ann, Lisa and Mary's STBs ahead of the pre-scheduled time. In step 4, Ann's TV is turned on automatically at 7 a.m. on Saturday and a virtual breakfast program title is displayed on Ann's TV. The STB at one of the locations requests a three way video conferencing call through a VoIP/IMS network to establish a communication session with Ann, Mary and Lisa.

In step 5, the VoIP/IMS network establishes the three way video conferencing. At this point, Ann can see Mary and Lisa on her TV display. Lisa can see Mary and Ann on her TV display. Mary can see Ann and Lisa on her TV display. The pre-recorded program starts to run in sync in a separate window with Lisa showing how to cook a continental breakfast. While watching the program, Ann, Mary and Lisa can have a conversation while eating their own breakfast in their individual homes.

Figure 9:
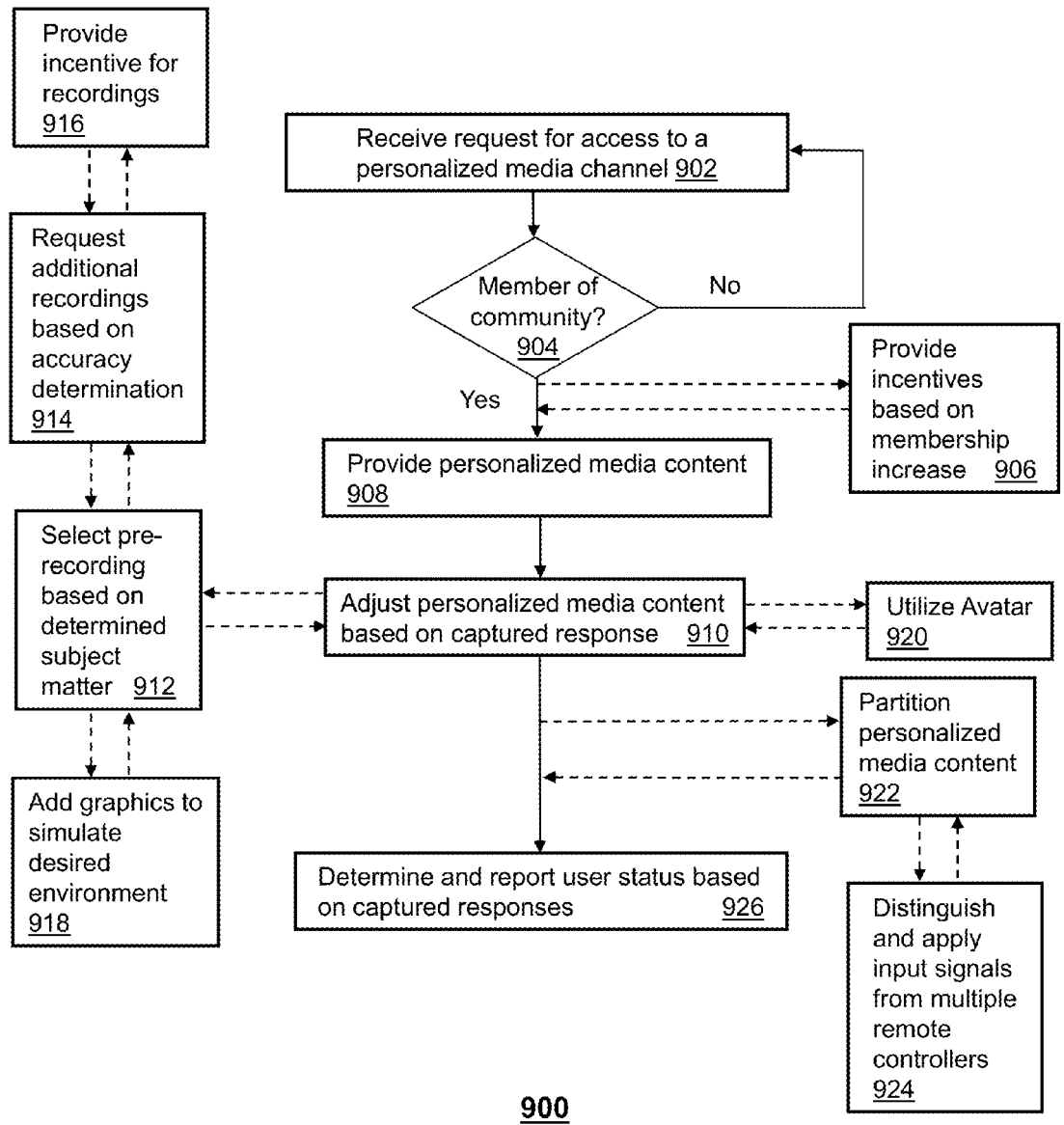
FIG. 9 depicts an illustrative embodiment of a method operating in portions of the system and process flow of FIGS. 1, 4, 6 and 8.

FIG. 9 depicts an illustrative method 900 that operates in portions of the devices, systems and/or process flows of FIGS. 1-8. Method 900 can begin at 902 with a request for access to a personalized media channel. The request can be made via the remote controller 700 or another device (e.g., a smartphone) in wireless communication with the STB 406. The request can also be made in other ways, such as a voice command that is recorded by the STB 406 and analyzed to determine that an access request has been made. At 904, a determination can be made (e.g., by the STB 406, the server 130 and/or another computing device) as to whether the requestor is a member of the community associated with the personalized media channel or otherwise is authorized to access to channel. For example, the channel may be shared between multiple communities and a determination as to membership to one of the multiple communities can be made. In another embodiment, guest privileges can be provided to an individual, such as for a limited period of time, from an existing member of the community.

In one embodiment at 906, incentives can be provided by a service provider based on the growth of community membership. The incentives can be financial, such as revenue sharing from advertising and/or service discounts, and/or the incentives can be in other forms, such as sharing of resources, providing additional communication services and so forth. Existing members that refer or otherwise motivate individuals to become new members can be provided with the incentives.

At 908 personalized media content can be provided to the STB 406 for presentation and viewing by the requestor (e.g., the viewer). The personalized media content can be in many forms, including pre-recorded segments. At 910, the personalized media content can be adjusted based on captured reaction information of the viewer. The reaction information can be captured images and/or captured audio recordings of the viewer, such as through use of the one or more video cameras 191 that are integrated into the STB 406. In one embodiment at 912, pre-recordings made by one or more individuals associated with the viewer (e.g., family members) can be selected based on a determined subject matter of the pre-recordings compared with the reaction information. The comparison can be based on a degree of responsive to the reaction information. For instance, first and second family members at different locations can each record a group of pre-recorded segments that are to be utilized during a virtual breakfast with the viewer. In one embodiment, metadata can be generated at the time of the pre-recording which summarizes or otherwise describes the subject matter of each of the pre-recorded segments. The metadata can be generated based on inputs provided by the first and second family members and/or based on an analysis including voice and/or image recognition to determine the subject matters of each of the pre-recorded segments. In another embodiment, the pre-recorded segments can be analyzed by the STB 406 that receives the segments and/or by the server 130. In this example, the pre-recorded segments can be selected in response to the reaction information to simulate a conversation between the viewer and one or both of the first and second family members. In another embodiment, trait information can be stored for each of the first and second family members and utilized in determining the selection of the pre-recorded segments.

In one embodiment at 914, an accuracy or responsiveness for the pre-recorded segments can be determined and requests for additional pore-recordings can be made based on the lack of accuracy or responsiveness. For example, reaction information from the viewer can be analyzed to determine that the viewer desires to discuss planting sunflowers in the garden. The pre-recordings may generally include a segment that indicates the first family member does not like to do outdoor work and is not knowledgeable about gardening, but may not provide any other information with respect to sunflowers. Based on a determination that the pre-recordings are not entirely responsive to the reaction information of the viewer, a request can be provided to one or both of the first and second family members to generate a pre-recording video segment that pertains to sunflowers. The newly generated pre-recorded segment can be presented in a subsequent communication session with the viewer, such as a virtual breakfast that occurs the following day.

In one embodiment at 916, incentives can be provided for generating pre-recordings. For instance, a first member of the community that has expertise in cooking can generate a cooking tutorial which is accessed by the viewer. Incentives can be provided to the first member (e.g., discount of the cost of services, revenue sharing for marketing material presented during the cooking tutorial by a commercial entity, and so forth) by the service provider.

In one embodiment at 918, graphics can be added to the personal content to further simulate a desired location of the first and second family members. For instance, a table can be added and the pre-recordings of the first and second family members can be adjusted to simulate the first and second family members sitting at the table together. In one embodiment, the table or other graphics can resemble or simulate the environment of the viewer, such as furniture in the viewer's home.

In one embodiment at 920, an avatar can be utilized to further interact with the viewer. The avatar can be used for assisting the viewer in utilizing the communication services. The avatar can further be utilized in assisting the viewer with other tasks, such as reminding the viewer of scheduled events or to take medicine. The avatar can resemble an individual familiar to the viewer, including having similar facial and voice features, which can be retrieved from a user profile.

Figure 10:
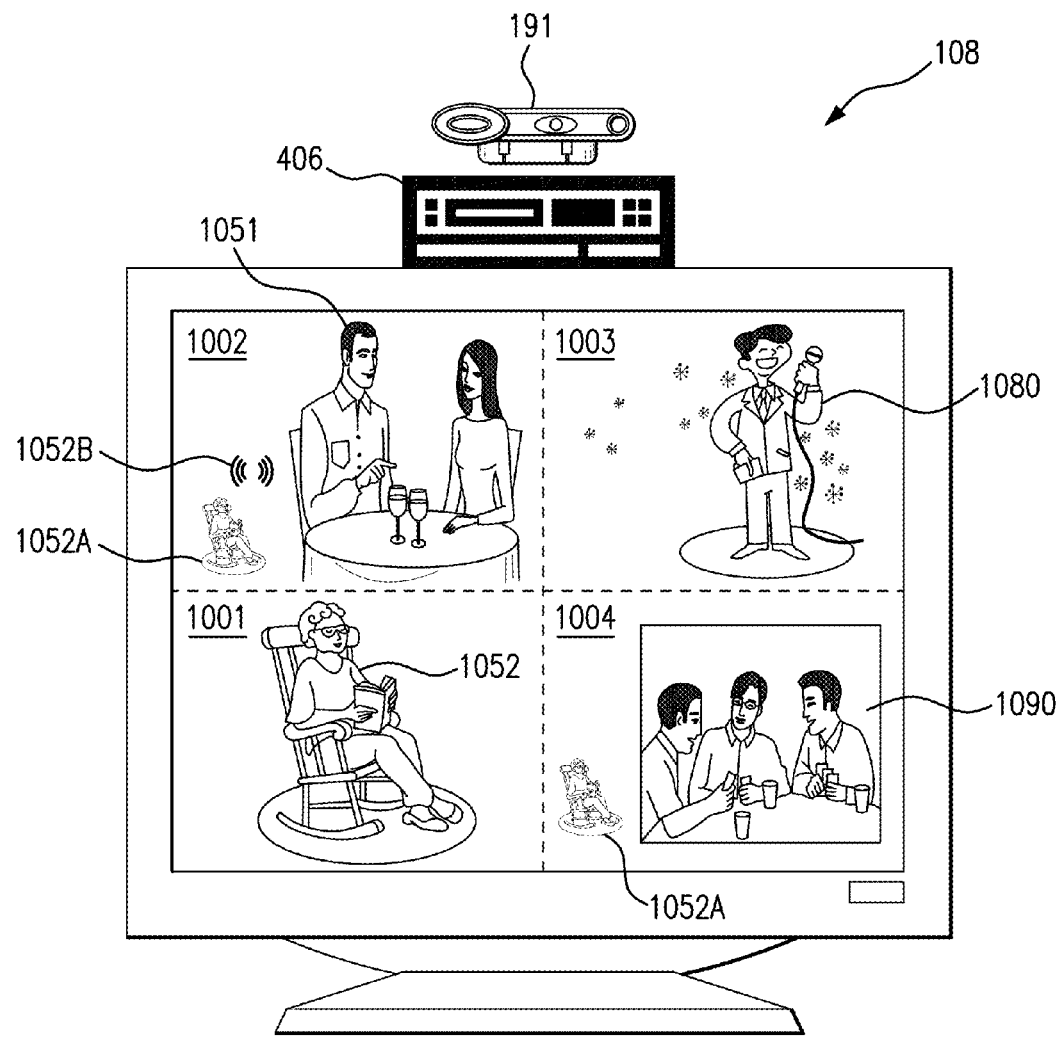
FIG. 10 depicts an illustrative embodiment of a display that can be presented using the systems, devices, process flows and methods of FIGS. 1-9.

In one embodiment at 922, the content being exchanged between STBs can be partitioned or otherwise selectively separated for determining recipients. As an example and referring additionally to the display screen 1000 of FIG. 10, the screen can be separated into any number of regions that show different content. A first region 1001 can present the captured video content 1052 of the viewer that is being captured by camera 191. A second region 1002 of the screen 1000 can present virtual breakfast pre-recorded segments 1051. In this example, the content 1051 can be a combination of real-time captured images of one family member at a first location that are combined with pre-recorded segments of a second family member that were captured from a second location. The content 1051 can further include added graphics, such as a table that simulates eating breakfast. The third region 1003 can include broadcast content 1080. A fourth region 1004 can be a real-time video conference 1090 with other members of the community that are engaged in an activity, such as playing cards.

In this embodiment, content transmission indicia can be displayed to advise the viewer of how content has been partitioned. For instance, captured images of the viewer (e.g., reaction information) can be provided to the STB associated with the first and second family members of content 1051 and the STB associated with capturing content 1090. The delivery of these images of the viewer can be made evident to the viewer based on the image transmission indicia 1052A appearing in regions 1002 and 1004. Additionally, audio content captured from the viewer (e.g., other reaction information) can be delivered to the STB associated with the first and second family members of content 1051 but not to the STB associated with capturing content 1090. The selective delivery of the audio content of the viewer can be made evident to the viewer based on the audio transmission indicia 1052B appearing in region 1002. The determination of recipients of the captured content can be performed based on a number of factors and techniques, including user preferences, subject matter analysis of the captured content, filters associated with potential recipients, and so forth.

In one embodiment at 924, multiple remote controllers 700 can be utilized simultaneously by different members located at a single location with a single STB 700 for interaction with the personalized media channels and the personal content. The STB 700 can distinguish between the signals from the different remote controllers and can apply the control signals to the corresponding content being displayed in the different regions of the screen 1000, as well as to different components of the STB 700, such as to a first integrated camera but not a second integrated camera.

In one embodiment at 926, the captured reaction information of the viewer can be analyzed and utilized for reporting a status of the viewer. As an example, captured images of the viewer can be analyzed to determine that the viewer is wearing a bandage. This information can be provided in the form of a status report to family members, friends, care givers and so forth. In another embodiment, captured audio content of the view, such as captured during the virtual breakfast, can be analyzed to determine that the viewer has indicated that she feels very warm. This information can be provided in a status report to family members, friends, care givers and so forth. The status report can be utilized as a continuous method of monitoring the health or status of the viewer as the viewer participates in the interactive personalized media services.

In one embodiment, the adjustment of content and/or other techniques described with respect to the exemplary embodiments can be performed based on an authorization or permission provided by the subscriber that has generated the personal content. The authorization or permission can be limited, such as allowing up-dating of marketing content but denying additions of marketing content. Original images can be maintained so that the subscriber can readily access the image in its captured form.

In one embodiment, the server 130, the STB 106 and/or another computing device can translate the captured audio content into a different language based on the language spoken by a user at another location that is accessing the personal content.

In one embodiment, server 130, the STB 106 and/or another computing device can analyze the personal content and/or monitor access to the personal content to determine targeted marketing content that can be provided with the personal content. A number of different factors to select the marketing content can be derived from the access to facilitate selection of targeted advertisements, such as identification information for the users (e.g., age, gender, occupation, salary, and so forth). The identification information can be determined from sources in combination with the monitoring of the access. For instance, monitoring the user access to the personal content can enable the server 130, the STB 106 and/or other computing devices to determine the identity of the users. User profiles associated with the users can then be consulted to determine other identification information, such as the examples described above. Sources other than user profiles can also be utilized for gathering identification information, such as subscriber plans of the users.

In one embodiment, demographic information can be determined for the personal content, such as typical characteristics of individuals that would desire to consume the personal content. The determined demographic information and/or identification information determined from the access monitoring can be compared to demographic information for the marketing content in order to select marketing content, such as selecting advertising images and/or audio that appeal to a certain age group or other demographic group.

In one embodiment, the server 130, the STB 106 and/or another computing device can present offers to advertise to various entities, such as an advertisement agency and/or a merchant. In one embodiment, some or all of the data gathered by the server 130, the STB 106 and/or another computing device based on the monitoring of the access and/or the demographic information can be provided to an advertising agency server to select particular marketing content which can then be offered to the merchant.

An offer, whether made from the server 130, the STB 106 and/or another computing device, can be based on the demographic information and/or the identification information as described above. In one embodiment, a value can be determined for the advertising and the offer can be based on the value. For instance, personal content of a user that has been accessed by several thousand people of a particular community may be deemed as a higher value than personal content that has been accessed by less than one hundred people in a smaller community.

The particular type of advertisement content presentable with the personal content can vary. For instance, the marketing content can be still or moving images that are overlayed on the images of personal content, such as in an area so as not to block points of interest in the images (e.g., an upper corner of the images). In one embodiment, the marketing content can be placed in the images of the personal content to simulate the advertisement being present in the environment. In one embodiment, other structures captured in the images and/or open space captured in the images can be detected and the marketing content can be positioned on the detected structures and/or open space, such as simulating the advertisement being on a wall that is captured in images of the location of a user generating the personal content.

In one embodiment, the marketing content or a portion thereof can be selectable in order to purchase product or service associated with the advertisement. In one embodiment, a selection of the marketing content or a portion thereof can provide a link to a website of a merchant (e.g., being run by the server 130) so that the user who selected the advertisement can purchase product or service associated with the advertisement. The exemplary embodiments can include other configurations and methodologies to enable purchase of product via a selection of the marketing content or a portion thereof, such as providing a link to a third party that manages the purchase process. The exemplary embodiments can also include revenue sharing for the user that generated the personal content and/or the service provider that provided the access to the personal content. For example, sales of products that are associated with a selection of the marketing content and/or access to a website of a merchant via the selection of the advertisement can be used to calculate revenue to be provided to one or both of the user that generated the personal content and the service provider that provided the access to the personal content.

In one embodiment, the marketing content can be an object that was captured in the images of the personal content and is adjusted to be advertisement content. For example, a soda bottle can be detected by the server 130 through use of image recognition. The image and/or text recognition can be used to identify a merchant associated with the particular brand of soda. The personal content can be adjusted so that object (e.g., the soda bottle) can be selectable by a user who accesses the personal content. A selection by the user can enable purchasing of the product (or service depending on the object that is made selectable) and/or reviewing additional information related to the selectable object. In one embodiment, a symbol or highlighting of the perimeter of the object can be used to indicate to the user who has accessed the personal content that the object is selectable. In one embodiment, a selection of the object can provide a link to a website of a merchant that sells the product or service. The exemplary embodiments can include any number and type of objects being made selectable. In one embodiment, the number and/or types of objects made selectable can be controlled by the user that generated the personal content. In one embodiment, the type of objects made selectable can be based on demographic information and/or the identification information gathered from monitoring the access to the personal content.

Upon reviewing the aforementioned embodiments, it would be evident to an artisan with ordinary skill in the art that said embodiments can be modified, reduced, or enhanced without departing from the scope and spirit of the claims described below.

For example, avatars can be utilized in place of or in addition to pre-recorded content for communication sessions. For instance, the server 130, the STB 106 and/or another computing device can search for a pre-recorded segment of a first user that is responsive to reaction information captured for a second user. Where a pre-recorded segment is unavailable or deemed not responsive enough, the server 130, the STB 106 and/or another computing device can utilize the avatar to interact with and respond to the reaction information of the second user. In one embodiment, the avatar can be generated based on facial and voice features of the first user to be similar in appearance to the first user. The avatar can present information (e.g., engage in a conversation with the second user) based on trait information of the first user, as well as the determined subject matter of the reaction information captured for the second user.

In another embodiment, the avatar can be utilized to introduce the second user to other users in the community, such as neighbors that also belong to the community and that can access the personalized media channel.

One or more of the exemplary embodiments can provide methods and apparatus for supporting end to end personalized community channel service business models (PCCSB), as well as methods and apparatus for integrating a set of technologies in support of the PCCSB. One or more of the exemplary embodiments can enable personalized community channel services for customers to receive differentiated TV social services for general subscribers as well as communities with common interests. One or more of the exemplary embodiments can enable TV being added as a major social media platform to allow users that are not familiar with computer/smartphone operations to participate in social media activities. One or more of the exemplary embodiments can enable service providers to provide an innovative platform to an under-served market segment. One or more of the exemplary embodiments can enable improving a user retention ratio for service providers since it enables subscribers, members and/or organizers to create and/or pool specialized and personalized content, and to share such content via personalized channels. One or more of the exemplary embodiments can enable stimulating customer content creations using existing equipment. The increase in content can encourage more usage.

Figure 11:
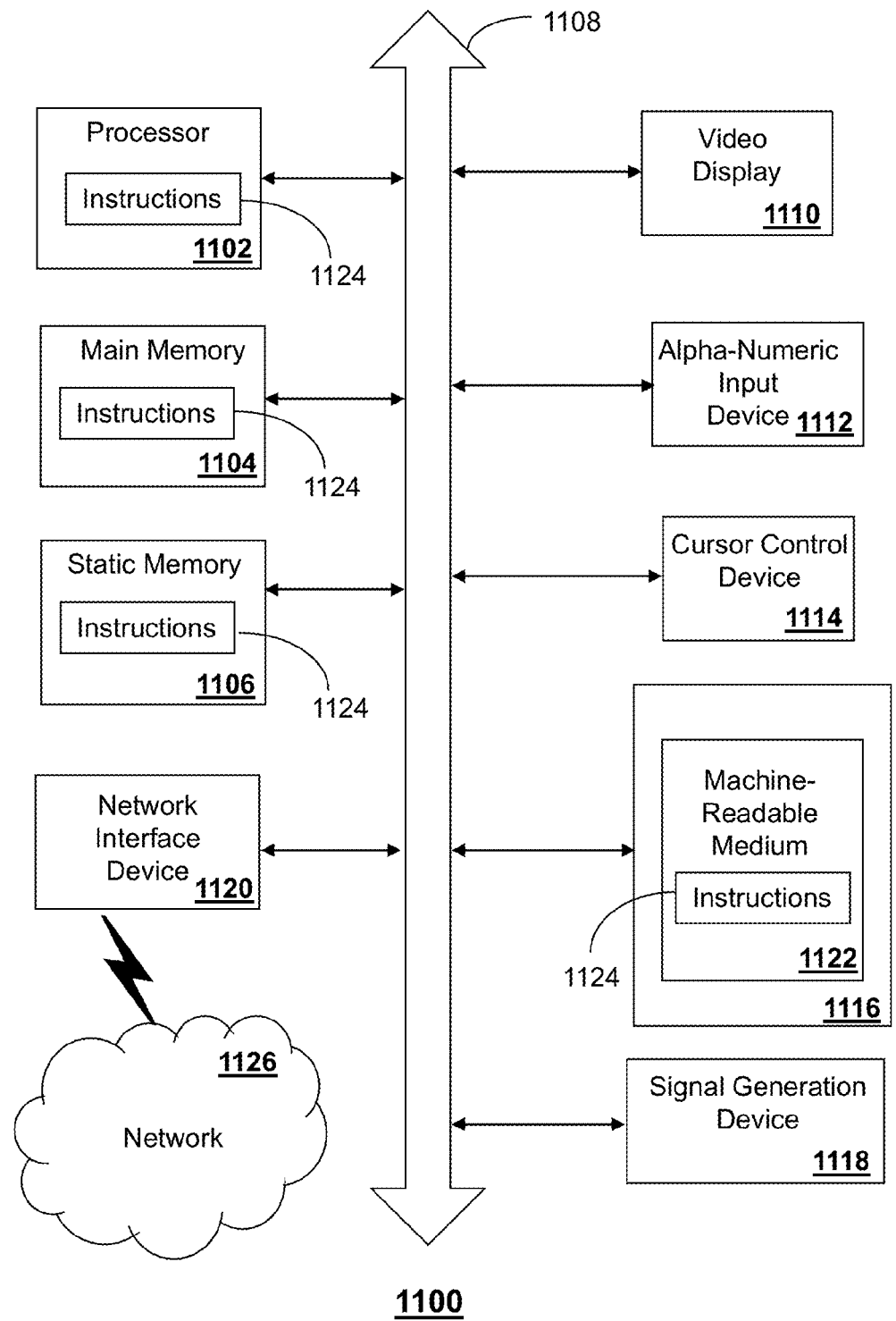
FIG. 11 is a diagrammatic representation of a machine in the form of a computer system within which a set of instructions, when executed, may cause the machine to perform any one or more of the methods discussed herein.

FIG. 11 depicts an exemplary diagrammatic representation of a machine in the form of a computer system 1100 within which a set of instructions, when executed, may cause the machine to perform any one or more of the methods discussed above. One or more instances of the machine can operate, for example, as a controller circuit and/or memory of the server 130, the media processor 106, the mobile communication devices 116, the cameras 191, the STB 406, the remote controller 700 or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, a circuit or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor 1102 (e.g., a central processing unit (CPU), a graphics processing unit (GPU, or both), a main memory 1104 and a static memory 1106, which communicate with each other via a bus 1108. The computer system 1100 may further include a video display unit 1110 (e.g., a liquid crystal display (LCD), a flat panel, or a solid state display. The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment, and it is further contemplated that features from different embodiments may be combined together. Thus, the following claims are hereby incorporated into the Detailed Description, with each claim standing on its own as a separately claimed subject matter.

What is claimed is:

1. An apparatus, comprising:
a processor; and
a memory that stores executable instructions that, when executed by the processor, facilitate performance of operations, comprising:
generating a personalized media channel, wherein access to the personalized media channel is granted to a first equipment of a first premises, second equipment of a second premises and third equipment of a third premises;
obtaining a subject matter from the third equipment;
presenting, over a network, the subject matter to the first equipment and to the second equipment, wherein the presented subject matter further comprises presenting a menu of topics for selection of the subject matter of the personalized media channel based on determined subject matter from past communication sessions with a third user of the third equipment;
receiving, over the network, a plurality of first recorded segments captured by a first video camera at the first premises, the plurality of first recorded segments comprising video and audio content of a first user based on the selected subject matter;
receiving, over the network, a plurality of second recorded segments captured by a second video camera at the second premises, the plurality of second recorded segments comprising video and audio content of a second user based on the selected subject matter;
generating personalized content, wherein the personalized content comprises a first portion comprising one first recorded segment of the plurality of first recorded segments and a second portion comprising one second recorded segment of the plurality of second recorded segments, wherein the first portion and the second portion are selected according to the subject matter, and wherein the personalized content simulating the first and second users being together at a single location by manipulating recorded images of the first and second users to be combined for the simulating of the single location;
providing the personalized content via the personalized media channel to a set top box at the third premises of the third user for presentation;
receiving reaction information from the set top box that is representative of a reaction by the third user to the presentation of the personalized content, the reaction information being captured by an image sensor and an audio sensor coupled with the set top box for capturing video and audio content of the third user;
accessing first trait information associated with the first user and second trait information associated with the third user;
analyzing the reaction information to determine a response, wherein the response is determined based in part on the first and second trait information;
selecting one other first or second recorded segment from the plurality of first and second recorded segments based on a comparison of the response with the subject matter for each of the plurality of first and second recorded segments;
adjusting the personalized content to generate adjusted personalized content that includes the one other first or second recorded segment; and
determining an accuracy of the one other first recorded segment or second recorded segment with respect to the response, wherein the determining the accuracy comprises determining another subject matter relevant to the third user and determining if the adjusted personalized content matches the other subject matter based on the reaction.

2. The apparatus of claim 1, wherein the operations further comprise providing the adjusted personalized content via the personalized media channel to the set top box for presentation.

3. The apparatus of claim 2, wherein the operations further comprise adjusting the personalized content to simulate the first and second users being together with the third user at the third premises.

4. The apparatus of claim 3, wherein the operations further comprise adjusting the personalized content to add graphics that simulate the third premises.

5. The apparatus of claim 2, wherein the operations further comprise: identifying additional subject matter for future recorded segments based on the adjusting of the personalized content; selecting one of the first or second users to record the future recorded segments based on the additional subject matter and the first and second trait information; and providing a message to a communication device of the one of the first or second users that includes a request for a recording related to the subject matter.

6. The apparatus of claim 2, wherein the operations further comprise adjusting the personalized content to add graphics that simulate an environment of the single location.

7. The apparatus of claim 1, wherein the generating personalized content further comprises determining the subject matter based on an input from the third user.

8. The apparatus of claim 2, wherein the operations further comprise: providing a message to a communication device associated with one of the first or second users when the accuracy does not satisfy an accuracy threshold, wherein the message requests one additional recorded segment be provided that is responsive to the reaction information of the third user.

9. The apparatus of claim 2, wherein the operations further comprise determining an accuracy of the one other first or second recorded segment with respect to the response based on subsequent reaction information received from the set top box that is representative of a subsequent reaction by the third user to the presentation of the adjusted personalized content.

10. The apparatus of claim 9, wherein the operations further comprise: analyzing the reaction information and the subsequent reaction information to determine a status of the third user; accessing presence information associated with one of the first or second users; selecting a communication device associated with one of the first or second users based on the presence information; and providing a message indicating the status of the third user to the communication device.

11. The apparatus of claim 2, wherein the personalized media channel is associated with a first community, wherein the first, second and third users are members of the first community, wherein the access to the personalized media channel is based on membership in the first community, and wherein the operations further comprise providing the set top box associated with the third user with access to another personalized media channel based on membership by the third user in a second community that is associated with the other personalized media channel.

12. A non-transitory machine-readable storage medium, comprising executable instructions that, when executed by a processor, facilitate performance of operations, comprising:
generating a personal media channel, wherein access to the personal media channel is granted to first media devices of first users at different first locations, and a second media device of a second user provided at a second location;
generating a subject matter topics obtained from second user for the generation of the personal media channel resulting in subject matter topics;
presenting, over a network, the subject matter topics to the first media devices, wherein the presented subject matter topics further comprises presenting a menu of topics for selection of the subject matter topics of the personalized media channel based on determined subject matter from past communication sessions with the second user of the second media device;
receiving recorded segments from different first users at different first locations through the personal media channel according to the selected subject matter topics;
determining personalized content from the recorded segments according to the subject matter topics, wherein the personalized content comprises a first portion of the recorded segments;
providing the personalized content to the second media device via the personalized media channel, wherein the second media device is provided at the second location;
receiving reaction information from a sensor located at the second location that is representative of a reaction by the second user at the second location to a presentation of the personalized content;
analyzing the reaction information to determine a response based in part on trait information associated with the different first users;
selecting a second portion of the recorded segments based on a comparison of the response with a context identified for each of the recorded segments; and
adjusting the personalized content to generate adjusted personalized content that includes the second portion of the recorded segments, wherein the personalized content and the adjusted personalized content simulate the different first users being present at a single location by manipulating recorded images of the different first users to be combined for simulating of the single location, the recorded images of the different first users being obtained from the first portion of the recorded segments and the second portion of the recorded segments;
providing financial incentives to the different first users for generating a portion of the recorded segments; and
determining an accuracy of the personalized content with respect to the response, wherein the determining the accuracy comprises determining a topic relevant to the second user and determining if the adjusted personalized content matches the topic based on the reaction.

13. The apparatus of claim 12, wherein the operations further comprise presenting a menu of topics based on previous subject matters selected by the third user to the set top box to select the subject matter.

14. The non-transitory machine-readable storage medium of claim 12, wherein the operations further comprise adjusting the personalized content to add graphics that simulate an environment of the single location.

15. The non-transitory machine-readable storage medium of claim 14, wherein the operations further comprise selecting the graphics based on a subject matter associated with the personalized content.

16. The non-transitory machine-readable storage medium of claim 12, wherein the providing financial incentives further comprises including marketing material related to the recorded segments.

17. The non-transitory machine-readable storage medium of claim 12, wherein the operations further comprise:
providing access to the personalized media channel based on membership in a community; and
providing revenue sharing to one first user of the different first users based on an increase in the membership of the community.

18. The non-transitory machine-readable storage medium of claim 12, wherein the subject matter is based on an input from the second user.

\* \* \* \* \*